March 7, 1944.  C. GETZ  2,343,767
ICE CREAM AND ICE CREAM MAKING
Filed July 8, 1936
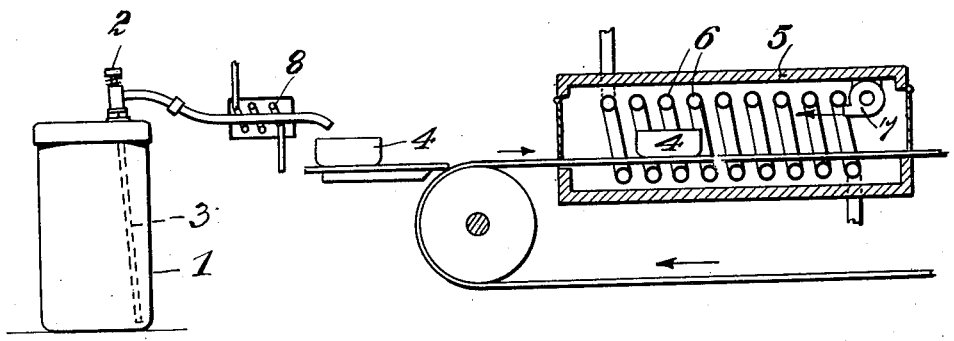
INVENTOR.
Charles Getz
BY Edward Thomes,
his ATTORNEY.

Patented Mar. 7, 1944

2,343,767

UNITED STATES PATENT OFFICE 2,343,767

ICE CREAM AND ICE CREAM MAKING

Charles Getz, Urbana, Ill., assignor, by mesne assignments, to Aeration Processes, Inc., Columbus, Ohio, a corporation of Ohio Application July 8, 1936, Serial No. 89,512

8 Claims. (Cl. 99—136)

This invention relates to ice cream and ice cream making and is herein disclosed in some detail as embodied in a commercial ice cream although the procedure is well adapted for making ice cream in homes equipped with an electrical or gas refrigerator.

Commercial ice cream often is manufactured by homogenizing the mix, and then beating the ice cream mix to whip it to produce the desired over-run. The whipped mixture is then run or transferred into molds and the filled molds are carried in a cold room where freezing is carried out.

The beating of the mix to whip the cream mix is an uncertain operation, the bubbles vary in size, the consistency of the mix varies in different portions, and there is always the need of careful supervision to avoid the formation of butter in large or small amounts.

The beating or whipping of the mix, as indicated above, is a highly uncertain operation because the mechanical beaters used break down many or most of the bubbles almost as rapidly as they are formed, and do not always break the larger bubbles, with the result that the final bubbles vary largely in size, whereas to produce a perfect ice cream it is necessary that small bubbles of uniform size be uniformly distributed. This need for bubbles of uniform size arises from the fact that bubbles of widely different sizes produce bubble walls of varying thickness and thin films of different thicknesses vary in their properties, freezing at different temperatures and producing different kinds of walls when they freeze. These variations indirectly produce other variations in the texture of the ice cream. The permissible increase in volume of saleable ice cream, called over-run, is in many places defined by law, and the ice cream manufacturer has to follow empirical methods in trying to produce the maximum over-run allowed under the laws, but never exceeding what is permitted.

According to the present invention the foregoing and other objections and difficulties are overcome and a procedure is provided which produces a smooth and uniform ice cream; easily controlled so to have any desired over-run, with bubbles within a narrow range of sizes.

In the form of the invention herein disclosed in some detail the ice cream mix is beaten or whipped by releasing pressure which holds a suitable charge of water-soluble gas in solution in the ice cream mix. The pressure of gas is so adjusted to the amount of butter fat present in the cream, and to the amount of other solid particles present that the desired type of ice cream may be infallibly produced every time ice cream is made.

Thus the desired over-run is always obtained and the measured volume of ice cream always fits the computed weight of that volume.

Other features and advantages will hereinafter appear.

The accompanying drawing shows diagrammatically in section one suitable device for carrying out the procedure for making ice cream according to the present invention.

An ice cream mix was made with cream of

12% butter fat
14½% sugar, condensed milk to produce
12% serum solids
0.35% egg yolk
0.35% gelatin or alginate gelatin substitute and flavor.

The whole mix contained 35% solids.

A container 1, was half-filled with this mix after homogenization and chilled to below 32° F., as low as possible without freezing probably about 26° F. There was then introduced through the valve 2 into the closed container nitrous oxide gas to yield a pressure of 35 to 45 lbs. to the square inch after shaking the container. The chilling could be continued, if desired, for the dissolved gas lowers the freezing point.

The valve 2 was then released and the mix issued from the tube 3 in a stream of whipped mix distended by almost microscopic bubbles to a stiff whip of uniform texture and structure. The release of pressure further lowered the temperature by the expansion of the released gas, and the chilled mix was run into a container 4 so as to exactly fill it.

The container was immediately put into a cold freezing chamber 5 shown diagrammatically as surrounded with brine coils 6 and provided with a fan 7 for circulating the cold air. This freezing chamber may be either a mechanical domestic refrigerator or a factory freezing room. When this mix was properly frozen the container 4 was removed full of a smooth, attractive, uniform, even-textured ice cream.

Other non-acid forming gases which are readily soluble in the ice cream mix and which do not impart a substantial odor or taste to the ice cream, such as dimethyl oxide and difluor-dichlormethane, may be substituted for nitrous oxide. Carbon dioxide, while water soluble, may be objectionable in substantial amounts because it would impart a sharp acid biting taste to the ice cream.

When preferred it may be possible to keep the mix in the container at a temperature of 32° F. to 40° F. for a short time and to chill as it comes out through the tube 3 by surrounding the tube with a chilling device shown diagrammatically as brine coils 8.

It is found that nitrous oxide has a tendency to homogenize the mix, apparently greatly reducing the number of large fat globules, so that the preliminary homogenizing may be unnecessary.

Moreover, the slightly sweet taste of nitrous oxide gas makes it preferable to use for ice cream. In addition, nitrous oxide is an inert, neutral gas under the conditions of working and is free from any tendency to sour the cream or other ingredients.

When a cream carrying a higher percentage of butter fat is used, it is usually advisable to whip with a higher pressure of gas in the container. But the pressure is usually well below the 80 pounds pressure found advisable to use in whipping cream which is not to be frozen.

Having thus described in some detail certain embodiments of the invention, what is claimed is:

1. The process of making ice cream comprising causing an ice cream mix to absorb nitrous oxide under pressure without freezing the same and tending to homogenize the mix, and thereafter releasing the pressure so as to expand the mix and thereafter refrigerating the expanded mix.

2. The process of making ice cream comprising causing an ice cream mix to absorb under pressure without freezing the same, a gas of the class consisting of nitrous oxide, dimethyl oxide and difluordichlormethane, and thereafter releasing the pressure to expand the mix and thereafter refrigerating the expanded mix to form ice cream.

3. The process of making ice cream comprising causing an ice cream mix to absorb a water soluble gas under pressure without freezing the same, and thereafter releasing the pressure so as to expand the mix and thereafter refrigerating the expanded mix to form ice cream.

4. The process of making ice cream comprising causing an ice cream mix to absorb under pressure a non-acid forming gas which is readily soluble in the ice cream mix and which imparts substantially no ordor or taste to the final product, the said mix being in a non-frozen condition, and thereafter releasing the pressure so as to form an aerated expanded product and thereafter freezing said expanded product to form ice cream.

5. Ice cream having distributed therethrough minute gas cells containing nitrous oxide in effective amount to reduce the number of large fat globules and cause homogenization.

6. Ice cream having distributed therethough minute gas cells containing in effective amount a gas of the class consisting of nitrous oxide, dimethyl oxide and difluordichlormethane.

7. Ice cream having distributed therethrough minute gas cells containing a non-acid forming gas which is readily soluble in the ice cream mix and which imparts substantially no odor or taste to the ice cream, said gas being present in effective amount.

8. The process of making ice-cream comprising causing an ice-cream mix to absorb under pressure and in the cold a gas of the class consisting of nitrous oxide, dimethyl oxide and difluordichlormethane, and thereafter releasing the pressure to expand the mix and thereafter refrigerating the expanded mix to form ice-cream.

CHARLES GETZ.